United States Patent [19]

Seager, Sr.

[11] Patent Number: 4,896,757
[45] Date of Patent: Jan. 30, 1990

[54] BOLT ON ELECTROMAGNETIC FAN CLUTCH

[75] Inventor: Kenneth F. Seager, Sr., Big Flats, N.Y.

[73] Assignee: Facet Enterprises, Incorporated, Tulsa, Okla.

[21] Appl. No.: 242,287

[22] Filed: Sep. 6, 1988

[51] Int. Cl.$^4$ .............................................. F16D 27/10
[52] U.S. Cl. .................................. 192/84 C; 123/41.12
[58] Field of Search ........................ 192/84 C, 82 T; 123/41.12

[56] References Cited

U.S. PATENT DOCUMENTS

| | | | |
|---|---|---|---|
| 2,919,777 | 1/1960 | Walter | 192/84 C |
| 3,924,585 | 12/1975 | Woods | 192/84 C X |
| 4,074,662 | 2/1978 | Estes | 192/84 C X |
| 4,119,184 | 10/1978 | Mower et al. | 192/82 T |
| 4,278,161 | 7/1981 | Mower et al. | 192/84 C |
| 4,285,421 | 8/1981 | Halsted | 192/84 C |
| 4,302,156 | 11/1981 | LaFlame | 192/82 T X |
| 4,310,085 | 1/1982 | LaFlame | 192/82 T X |
| 4,566,574 | 1/1986 | Marshall | 192/84 C |
| 4,718,529 | 1/1988 | Kroeger et al. | 192/84 C X |

FOREIGN PATENT DOCUMENTS

| | | | |
|---|---|---|---|
| 0010378 | 4/1980 | European Pat. Off. | 123/41.12 |
| 0020258 | 2/1989 | Japan | 192/84 C |
| 2080880 | 2/1982 | United Kingdom | 192/84 C |

Primary Examiner—Rodney H. Bonck
Attorney, Agent, or Firm—Remy J. VanOphem

[57] ABSTRACT

An electromagnetic fan clutch having a radial flange adapted to be mounted to the fan drive hub of an internal combustion engine and an axial shaft connected to the radial flange. A fan hub, adapted to have a fan mounted thereto, is rotatably connected to the drive shaft adjacent to the radial flange. The radial flange has an axial hub spacing the fan hub from the flange portion of the radial flange a distance sufficient for the insertion of mounting bolts. An annular armature is connected to the fan hub by a plurality of leaf springs axially biasing the armature away from a stator. The stator is fixedly attached to the axial shaft and rotates therewith. A solenoid coil enclosed in a coil housing is disposed adjacent the stator. The coil housing is rotatably connected to the axial shaft and is held stationary by an anchor strap connected between the coil housing and a convenient stationary member in the engine compartment.

12 Claims, 2 Drawing Sheets

BOLT ON ELECTROMAGNETIC FAN CLUTCH

BACKGROUND OF THE INVENTION

1. Field of the Invention

The invention is related to the field of electromagnetic clutches and, in particular, to an electromagnetic fan clutch which may be bolted to an existing fan drive hub associated with an internal combustion engine.

2. Description of the Prior Art

Electromagnetic fan clutches for internal combustion engines of the type taught by Pierce in U.S. Pat. No. 2,796,962 and more recently by Mower in U.S. Pat. Nos. 4,119,184 and 4,278,161 have found wide acceptance, particularly in the trucking industry. As is known, automotive radiator fans can consume considerable power, especially at high road speeds, where the augmentation of the air flow through the engine's radiator is usually not necessary for adequate engine cooling. Therefore, electromagnetic fan clutches which are capable of disconnecting the fan from the engine's fan drive whenever the engine is cold or being adequately cooled by the air being ducted through the radiator at nominal to high speed driving conditions could eliminate this waste of engine power. Up until recently, the fuel savings realized by disconnecting the fan from the fan drive when not needed did not justify the cost of these electromagnetic fan clutches. However, with the increase in the price of fuel, this condition no longer exists and now the use of electromagnetic clutches controlling the operation of the radiator fan is economically justifiable. A considerable market now exists for retrofitting vehicles, especially trucks with electromagnetic fan clutches which are controlled by sensors detecting the temperature of the engine and/or its coolant.

The problem with the fan clutches taught by Mower et al is that due to the limited space between the fan drive hub and the radiator, the solenoid coil housing is located adjacent to the flange which mounts to the fan drive hub of the internal combustion engine. The space between the flange and the solenoid coil housing is too small to permit the insertion of bolts which secure the flange to the fan drive hub. These fan clutches come in kit form, in which the fan clutch assembly is disassembled. This permits the flange to be bolted to the fan drive before the solenoid coil housing is connected on the shaft. In the mounting of this type of fan clutch the individual component of the clutch must be mounted on the fan drive in a predetermined sequence. The invention is an improved version of the electromagnetic fan clutch of the type taught by Mower et al which is pre-assembled at the factory and only needs to be bolted to the engine's fan drive hub.

SUMMARY OF THE INVENTION

The invention is an electromagnetic fan clutch assembly mountable to the fan drive hub of an internal combustion engine. The fan clutch assembly includes a drive shaft having a radial flange disposed at one end thereof, the radial flange being adapted to be connected to the engine's fan drive hub. The radial flange has a hub portion offset a predetermined distance from a flange portion. A fan hub is rotatably attached to the drive shaft adjacent to the radial flange. The fan hub has means for attaching a fan member thereto. A magnetically permeable annular armature is disposed adjacent to the fan hub. Spring means connect the armature to the fan hub for rotation therewith. The spring means produces an axial force urging the armature in an axial direction towards the fan hub. A magnetically permeable annular stator is disposed adjacent to the armature and spaced a predetermined distance therefrom. The stator is fixedly connected to the drive shaft and is rotatable therewith. A magnetically permeable coil housing is rotatably connected to the drive shaft adjacent to the stator. The coil housing has an annular cavity circumscribing the drive shaft. The annular cavity is open on the side facing the stator. A solenoid coil is disposed in the annular cavity for generating a magnetic field producing a magnetic force axially displacing the armature into engagement with the stator and clamping it thereto so that the armature and fan hub will rotate with the stator. An anchor strap is connected between the coil housing and a stationary member in the engine compartment to prevent the solenoid coil and the coil housing from rotating with the rotation of the drive shaft.

The primary object of the invention is an electromagnetic fan clutch assembly which can be pre-assembled at the factory and directly bolted onto the fan drive hub of an internal combustion engine.

Another object of the invention is an electromagnetic fan clutch assembly in which the hub to which the fan is mounted is located adjacent to the flange which mounts to the fan drive hub.

Another object of the invention is an electromagnetic fan clutch which is easy to install on existing internal combustion engines.

These and other objects of the invention will become more apparent from a reading of the specification in conjunction with the drawings.

DETAILED DESCRIPTION OF THE PREFERRED EMBODIMENT

Figure 1:
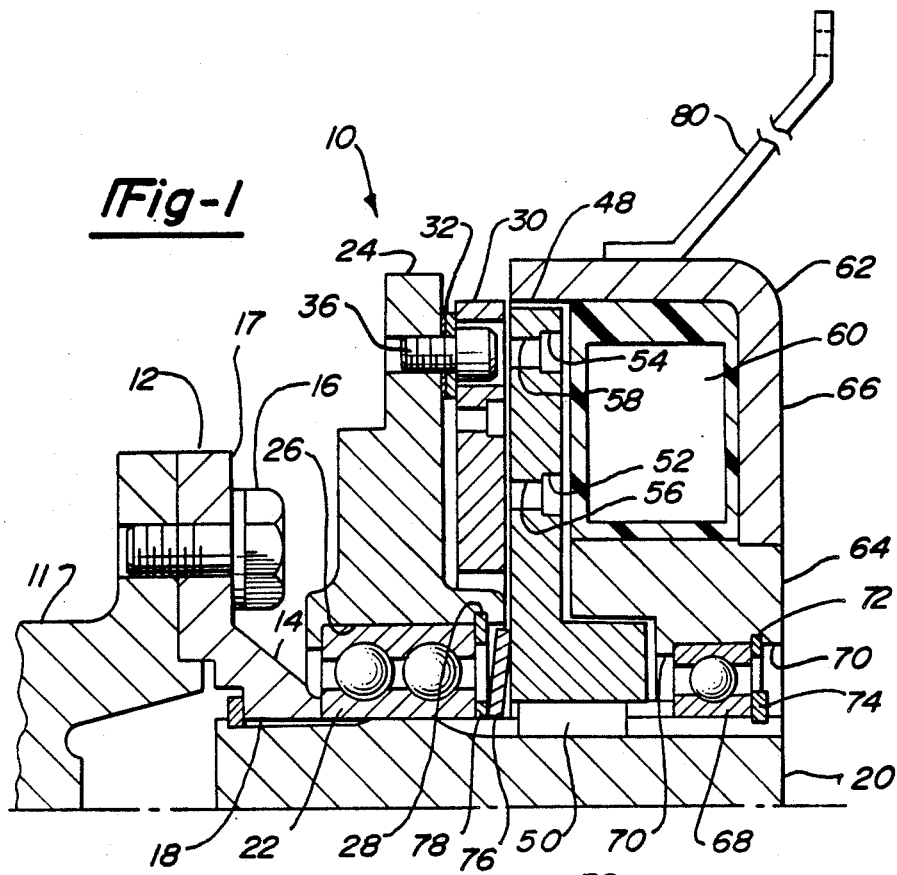
FIG. 1 is a partial cross-sectional side view of the electromagnetic fan clutch.

The detailed structure of the bolt on fan clutch 10 is shown in the cross-sectional side view of FIG. 1. The fan clutch 10 has a mounting flange 12 which is mounted directly on a rotatably driven fan mounting hub 11 of an internal combustion engine by means of a plurality of screw fasteners, such as bolts 16. The mounting flange 12 has a hub portion 14 offset from a flange portion 17. The hub portion 14 is offset from the flange portion 17 a distance sufficient to permit the insertion and tightening of the bolts 16, securing the mounting flange to the engine's fan drive hub. The hub portion 14 has a splined axial aperture 18 which engages a mating spline provided on the external surface of an axial shaft 20.

A first low friction bearing, such as a ball bearing 22, rotatably supports an inner fan hub 24 from the shaft 20. The outer race of the ball bearing 22 is contained between annular bearing seat formed at the bottom of an axial bearing bore 26 provided in the inner fan hub 24 and a snap ring 28 received in a snap ring groove provided in the inner fan hub 24 on the side of the ball bearing opposite the bearing seat. The inner race of the ball bearing 22 abuts a shoulder provided on the end of the hub portion 14 of the mounting flange 12 as shown. The inner fan hub has a plurality of threaded apertures (not shown) on the side facing the mounting hub flange 12 receiving bolts (not shown) securing the inner fan to the fan hub 24.

Figure 2:
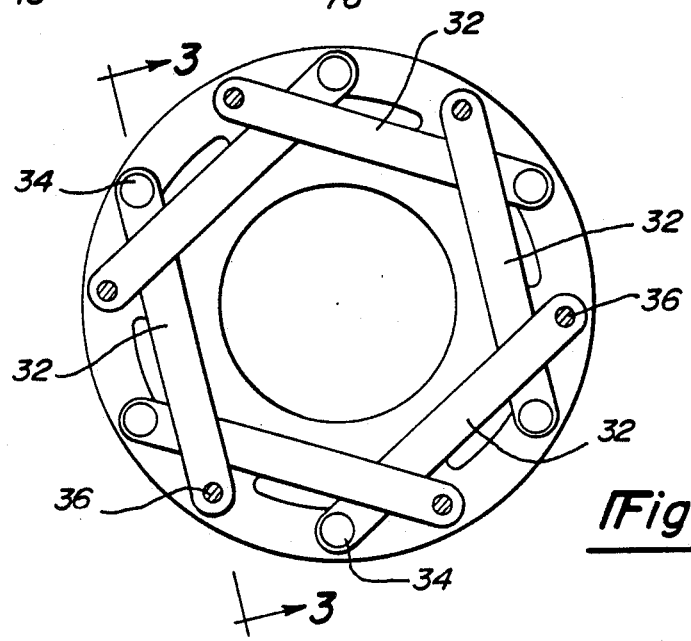
FIG. 2 is a cross-sectional view showing the arrangement of the leaf springs connecting the armature to the fan hub.
Figure 3:
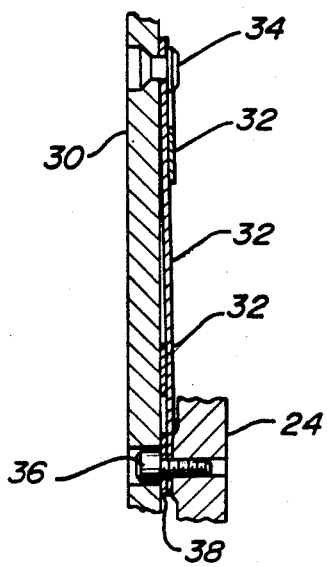
FIG. 3 is a partial cross-sectional view taken along line 3—3 of FIG. 2 showing the connection of the leaf springs between the armature and the fan hub.

An annular armature 30 is rotatably connected to the inner fan hub 24 by a plurality of leaf springs 32 extending in a generally circular pattern about the axis of rotation. As shown more clearly in FIGS. 2 and 3, one end of each leaf spring 32 is secured to the armature 30 by a rivet 34 while its opposite end is secured to the inner fan hub 24 by means of a threaded fastener, such as a bolt 36. A spacer 38, as shown in FIG. 3, in combination with the thickness of the leaf springs 32, produces a fixed or predetermined spacing between the inner fan hub 24 and the armature 30. The leaf springs 32 are interleaved as shown and produce an axially directed force resiliently urging the armature 30 towards its rest position against the inner fan hub 24.

Figure 4:
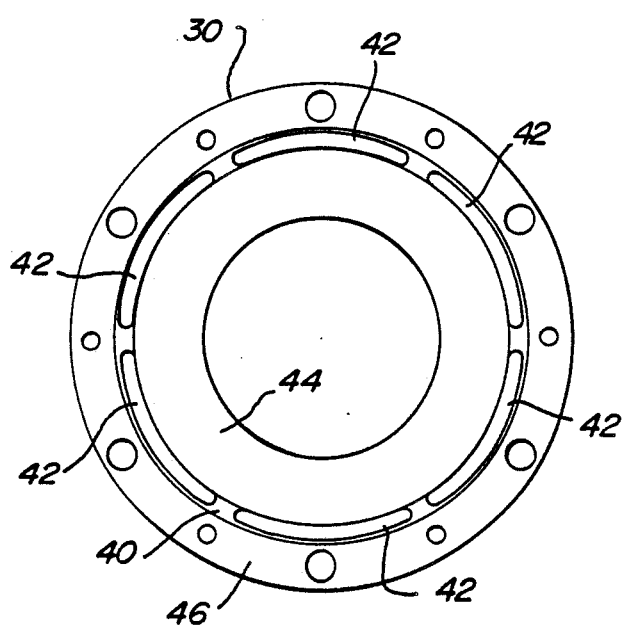
FIG. 4 is an end view of the armature showing the location of the arcuate slots.
Figure 5:
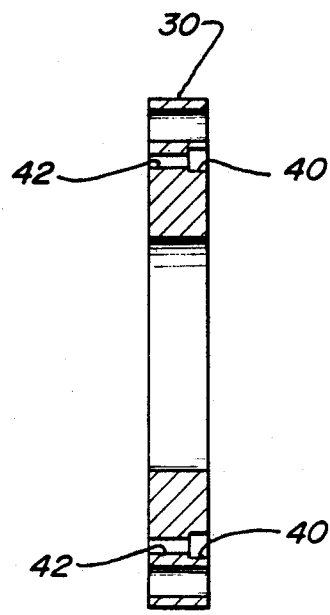
FIG. 5 is a cross-sectional view of the armature showing the relationship between the slots and the annular groove.

As more clearly shown in FIGS. 4 and 5, the armature 30 has an annular recess 40 provided on the side opposite the side facing the inner fan hub 24. A series of arcuate slots 42 are provided at the bottom of the annular recess 40. The annular recess 40 and the arcuate slots 42 impede the flow of magnetic flux from the inner portion 44 of the armature to its outer portion 46.

A stator 48 is fixedly attached to the shaft 20 adjacent to the armature 30 by means of a key 50 received in mating key slots provided in both the stator and the shaft 20. The stator 48 has an inner annular recess 52 and an outer annular recess 54 provided on its face opposite the armature 30. A plurality of equally spaced arcuate slots 56 and 58 are also provided at the bottom of the inner and outer recesses 52 and 54, respectively. The relationship of the arcuate slots 56 and 58 to their inner and outer annular recesses 52 and 54, respectively, is the same as the relationship of the armature's arcuate slots 42 to the armature's annular recess 40, as shown in FIGS. 4 and 5.

A solenoid coil 60 is potted in a coil housing 62 adjacent to the stator 48. The coil housing 62 consists of an annular base member 64 and a cover member 66 forming an annular cavity receiving the solenoid coil 60. Both the base member 64 and the cover member 66 are made from a magnetically permeable low carbon steel such as ASA 1008 or ASA 1010. The base member 64 of the coil housing 62 is rotatably attached to the shaft 20 by a second low friction bearing, such as a ball bearing 68. The outer race of the ball bearing 68 is received in an axial bearing bore 70 and is captivated between a bearing seat provided at the bottom of the bearing bore 70 and a snap ring 72. The snap ring 72 is received in a snap ring groove provided at the opposite end of the bearing bore 70.

The inner race of the ball bearing 68 is captivated between an annular shoulder protruding from the end of the stator 48 and a snap ring 74 received in a snap ring groove provided at the end of the shaft 20. A resilient member, such as a Belleville washer 76, disposed between the inner race of the ball bearing 22 and the stator 48, produces a resilient force urging the inner race of the ball bearing 22 against the shoulder of the hub portion 17 of the mounting flange 12 and the inner race of the ball bearing 68 against the snap ring 72. A ring-shaped spacer 78 may be disposed between the Belleville spring 76 and the inner race of the ball bearing 22 to assure that the axial force produced by the spring is applied against the inner race of the ball bearing 22.

An anchor strap 80 is connected between the coil housing 62 and a convenient stationary member in the engine compartment of the vehicle to inhibit the rotation of the solenoid coil 60 and the coil housing 62 with rotation of the shaft 20.

In operation, the fan mounting hub 11 is rotatably driven by the internal combustion engine directly or through pulleys in a conventional manner. The rotation of the hub portion 14 is transmitted to the shaft 20 by the mounting flange 12. The stator 48 which is attached to the shaft 20 will rotate therewith. The inner fan hub 24 mounted on the ball bearing 22 is not driven by the shaft 20 and will rotate freely as a result of wind and bearing friction forces. The leaf springs 32 hold the armature against the inner fan hub and away from the rotating stator 48. The solenoid coil 60 and the coil housing 62 are held stationary by the anchor strap 80.

Upon energizing the solenoid coil 60, a magnetic field is generated which causes the armature 30 to be attracted to the stator 48. The forces between the armature 30 and the stator 48 are sufficient to clamp the armature 30 to the rotating stator causing the inner fan hub 24 to rotate therewith. The inner fan hub 24 will continue to rotate as long as the solenoid coil 60 remains energized.

Upon de-energizing the solenoid coil 60, the magnetic attraction between the armature 30 and the stator 48 is significantly reduced. At this reduced attraction level, the leaf springs 32 will return the armature to its initial or rest position against the inner fan hub 24 disengaging it from the rotating stator 48.

Figure 6:
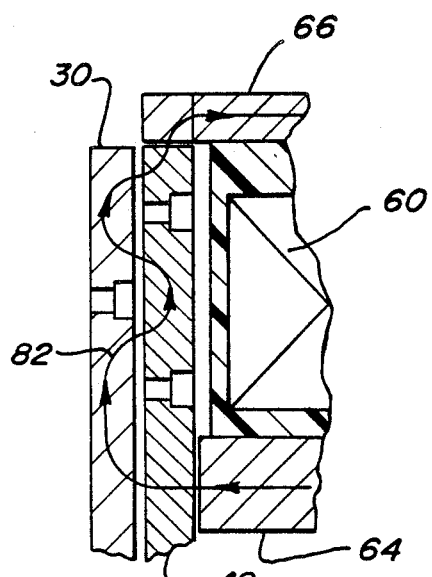
FIG. 6 is an enlarged sectional view showing the magnetic flux path generated by the solenoid coil through the stator and the armature.

The arcuate slots 42, 56 and 58 provided in the armature 30 and the stator 48 are to enhance the attractive force between the armature 30 and the stator 48. As shown in FIG. 6, the magnetic flux follows a serpentine path 82 between the armature 30 and the stator 48 crossing the gap therebetween four times. The multiple passing of the magnetic flux across the gap between the armature 30 and the stator 48 increases the attractive force produced by the magnetic field and reduces the electrical power required of the solenoid coil to clamp the armature to the stator.

Although the invention has been described with regard to a specific embodiment shown in the drawings, it is not intended that the invention be limited to this particular embodiment. It is recognized that those skilled in the art will be able to make certain structural changes without departing from the spirit of the invention as described herein and set forth in the appended claims.

What is claimed is:

1. An electromagnetic fan clutch assembly for mounting to the fan mounting hub of an internal combustion engine, said fan clutch assembly comprising:
   a drive means having a radial flange disposed at one end thereof, said radial flange being adapted to be connected to said engine's fan mounting hub, said radial flange having a hub portion, said drive means further comprising a shaft member having an external spline at one end thereof; and an internal spline on said hub portion, said internal spline of said hub portion being adapted to engage said external spline of said shaft member;

an inner fan hub rotatably attached to said shaft member adjacent to said radial flange, said inner fan hub having means for attaching a fan member thereto;

a magnetically permeable annular armature disposed adjacent to said inner fan hub;

spring means for connecting said armature to said inner fan hub for rotation therewith, said spring means producing an axial force urging said armature in an axial direction towards said inner fan hub;

a magnetically permeable annular stator disposed adjacent to said armature and spaced a predetermined distance therefrom, said stator being mounted to said drive means and rotatable therewith;

a magnetically permeable coil housing rotatably connected to said drive means, adjacent to said stator, said coil housing having an annular cavity circumscribing said drive means, said annular cavity being open on the side facing said stator;

a first low friction bearing rotatably connecting said inner fan hub to said shaft member;

a second low friction bearing rotatably connecting said coil housing to said shaft member;

said shaft member further having a first snap ring groove disposed adjacent to said one end and a second snap ring groove disposed at an opposite end;

a first snap ring disposed in said first snap ring groove to prevent the displacement of said hub portion off of said one end of said shaft member;

a second snap ring disposed in said second snap ring groove to prevent the displacement of said second low friction bearing off of said opposite end of said shaft member;

a resilient washer disposed between said first low friction bearing and said stator producing a resilient axial force urging said hub portion against said first snap ring and said second low friction bearing against said second snap ring;

a solenoid coil disposed in said annular cavity for generating a magnetic field producing a magnetic force axially displacing said armature into engagement with said stator and clamping it thereto so that said armature and said inner fan hub will rotate with said stator; and means connected between said coil housing and a stationary object to prohibit the rotation of said coil housing with the rotation of said drive means.

2. The fan clutch assembly of claim 1, wherein said stator has at least a first set of arcuate slots disposed along a first circle intermediate the inner and outer diameter of said annular armature.

3. The fan clutch assembly of claim 2, wherein said stator has a second set of arcuate slots disposed along a second circle having a diameter different from said first circle, said second circle also being intermediate the inner and outer diameters of said annular armature and wherein said annular armature has a third set of arcuate slots disposed along a circle having a diameter intermediate said first and second circles.

4. The fan clutch assembly of claim 1, wherein said first and second low friction bearings are ball bearings.

5. The fan clutch assembly of claim 1, wherein said spring means comprises a plurality of leaf springs, each of said plurality of leaf springs having one end connected to said fan hub and an other end connected to said armature.

6. A bolt on fan clutch assembly mountable on the fan mounting hub of an internal combustion engine comprising:

a drive shaft having a radial flange portion at one end, said radial flange portion being adapted to be connected to said fan mounting hub and a shaft portion connected at one end to said radial flange portion, said shaft portion further comprising a snap ring groove at an end opposite said radial flange portion;

an inner fan hub rotatably connected to said shaft portion adjacent to said radial flange portion, said inner fan hub having means for attaching a fan member thereto;

a magnetically permeable annular armature disposed concentric with said shaft portion adjacent to said inner fan hub;

a plurality of leaf springs connecting said armature to said inner fan hub, said leaf springs producing an axial force biasing said armature towards said inner fan hub;

a magnetically permeable annular stator attached to said shaft portion for rotation therewith, said stator being spaced a predetermined distance from said armature;

a magnetically permeable coil housing rotatably connected to said shaft portion, adjacent to said stator, said coil housing having an annular cavity circumscribing said shaft portion, said annular cavity being open on the side facing said stator;

said radial flange portion further having an axial hub portion forming a bearing seat facing said inner fan hub;

a first low friction bearing rotatably connecting said inner fan hub to said shaft portion, said first low friction bearing having an inner race abutting said bearing seat;

a second low friction bearing rotatably connecting said coil housing to said shaft portion;

a resilient member disposed between said first low friction bearing and said stator, said resilient member biasing said first low friction bearing against said bearing seat of said radial flange portion and said stator in a direction away from said annular armature;

a snap ring located in said snap ring groove at said end opposite said radial flange portion of said drive shaft, said snap ring prohibiting the displacement of said second low friction bearing in a direction away from said radial flange portion;

a solenoid coil disposed in said annular cavity for generating a magnetic field when energized, said magnetic field producing a magnetic force displacing said armature into engagement with said stator and clamping it thereto so that said armature and said inner fan hub will rotate with said stator; and an anchor strap connected between said coil housing and a stationary object to prevent the rotation of said coil housing with said shaft portion.

7. The fan clutch assembly of claim 6 wherein said resilient member is a Belleville washer.

8. The fan clutch assembly of claim 6 wherein said first and second low friction bearings are ball bearings.

9. The fan clutch assembly of claim 6 wherein said plurality of leaf springs extend generally circumferentially to the axis of rotation of said inner fan hub and said armature.

10. The fan clutch assembly of claim 9 wherein the ends of said leaf springs are interleaved.

11. The fan clutch assembly of claim 6 wherein said stator has at least one plurality of arcuate slots arranged along a first circular path whose diameter is intermediate the inner and outer diameters of said armature.

12. The fan clutch assembly of claim 11 wherein said stator has a second plurality of arcuate slots arranged along a second circular path, different from said first circular path, whose diameter is intermediate the inner and outer diameters of said armature, and wherein said armature has a third plurality of arcuate slots disposed along a third circular path intermediate said first and second circular paths.

* * * * *

UNITED STATES PATENT AND TRADEMARK OFFICE
CERTIFICATE OF CORRECTION

PATENT NO. : 4,896,757

DATED : January 30, 1990

INVENTOR(S) : Kenneth F. Seager, Sr.

It is certified that error appears in the above-identified patent and that said Letters Patent is hereby corrected as shown below:

Column 3, line 4, after "tween" insert ---- an ----.

Column 3, line 12, delete "hub".

Column 3, line 13, delete "inner".

Column 3, line 14, after "the" insert ---- inner ----.

Signed and Sealed this

Second Day of July, 1991

*Attest:*

HARRY F. MANBECK, JR.

*Attesting Officer*     *Commissioner of Patents and Trademarks*